United States Patent [19]
Yang

[11] Patent Number: 6,031,700
[45] Date of Patent: Feb. 29, 2000

[54] GROUND DETECTOR FOR A STATIC GROUNDING SYSTEM

[76] Inventor: Hsueh-Chang Yang, 4th Fl., No. 1, 560 Lane, Chung-Cheng Rd., Shin-Tien Hsien, Taiwan

[21] Appl. No.: 09/166,388

[22] Filed: Oct. 5, 1998

[51] Int. Cl.[7] .................................................. H02H 3/14
[52] U.S. Cl. ................................. 361/45; 361/50; 361/86; 340/649
[58] Field of Search .............................. 361/77, 78, 86, 361/88, 42, 45–46, 49, 50; 340/660–661, 540, 649, 657, 635; 324/500, 524, 525–526, 509, 510

[56] References Cited

U.S. PATENT DOCUMENTS

| | | | |
|---|---|---|---|
| 3,708,721 | 1/1973 | Marcade et al. | 361/50 |
| 3,891,894 | 6/1975 | Scarpino | 361/48 |
| 3,996,496 | 12/1976 | Volk, Jr. | 361/50 |
| 4,023,073 | 5/1977 | Georgi | 361/45 |
| 4,558,309 | 12/1985 | Antonevich | 340/649 |
| 4,649,454 | 3/1987 | Winterton | 361/50 |
| 5,726,900 | 3/1998 | Walter et al. | 702/60 |
| 5,754,114 | 5/1998 | Gnadt | 340/649 |

*Primary Examiner*—Jeffrey Gaffin
*Assistant Examiner*—Kim Huynh
*Attorney, Agent, or Firm*—Ostrolenk, Faber, Gerb & Soffen, LLP

[57] ABSTRACT

A ground detector includes a detecting circuit formed of a polarity test circuit, a voltage dropping and rectifying circuit, a grounding test circuit and an alarm device, wherein the polarity test circuit leads in AC power supply and tests the polarity of its power wires so as to discriminate the standard zero potential circuit of the earth wire or neutral wire for grounding test reference; the voltage dropping and rectifying circuit converts lead-in AC power supply into DC power supply for working of the grounding test circuit; the grounding test circuit leads in the zero potential wire which is identified by the polarity test circuit, and compares its potential with the test circuit, so as to determine the grounding condition of the grounding bus, and to drive the alarm device when an error grounding of the rounding bus is detected, causing the alarm to output an audio alarm signal.

23 Claims, 4 Drawing Sheets

GROUND DETECTOR FOR A STATIC GROUNDING SYSTEM

BACKGROUND OF THE INVENTION

The present invention relates to a static grounding system, and more specifically to a ground detector for detecting the grounding condition of the grounding bus of a static grounding system.

Static grounding systems are intensively used in integrated circuit fabrication and precision circuit assembly work places to guide static electricity from workers to the ground, enabling the fabrication or assembly process to be smoothly performed. The grounding condition of the static grounding work in an integrated circuit fabrication or precision circuit assembly work place greatly affects the quality of the fabricated or assembled electronic devices. In regular electronic industries, static grounding is achieved by attaching a grounding wrist belt to every worker in the work place, or placing a static protection pad on each table. The grounding wrist belt is connected to an earth rod through a grounding bus. Therefore, the grounding bus must be positively connected to earth so that static electricity can positively be guided to the ground. The grounding condition of the grounding bus is checked visually or by means of an electric meter. This grounding condition checking procedure takes much time and consumes much labor. The work side job must be stopped when checking the grounding condition of the grounding bus. Further, the checking result of this grounding condition checking procedure is not precise, because man errors cannot be completely eliminated. In case the circuit of the grounding bus is broken after a grounding check, the false grounding condition cannot be immediately detected, and electronic circuit devices under fabrication may be damaged by static electricity.

SUMMARY OF THE INVENTION

The present invention has been accomplished to provide a ground detector for a static grounding system which eliminates the aforesaid problems. It is the main object of the present invention to provide a ground detector for a static grounding system which monitors the grounding condition of the grounding bus, and automatically outputs an alarm signal when a poor grounding condition of the grounding bus occurs. According to one embodiment of the present invention, the ground detector comprises a detecting circuit formed of a polarity test circuit, a voltage dropping and rectifying circuit, a grounding test circuit and an alarm device, wherein the polarity test circuit leads in AC power supply and tests the polarity of its power wires so as to discriminate the standard zero potential circuit of the earth wire or neutral wire for grounding test reference; the voltage dropping and rectifying circuit converts lead-in AC power supply into DC power supply for working of the grounding test circuit; the grounding test circuit leads in the zero potential wire which is identified by the polarity test circuit, and compares its potential with the test circuit, so as to determine the grounding condition of the grounding bus, and to drive the alarm device when an error grounding of the grounding bus is detected, causing the alarm to output an audio alarm signal.

DETAILED DESCRIPTION OF THE PREFERRED EMBODIMENT

Figure 1:
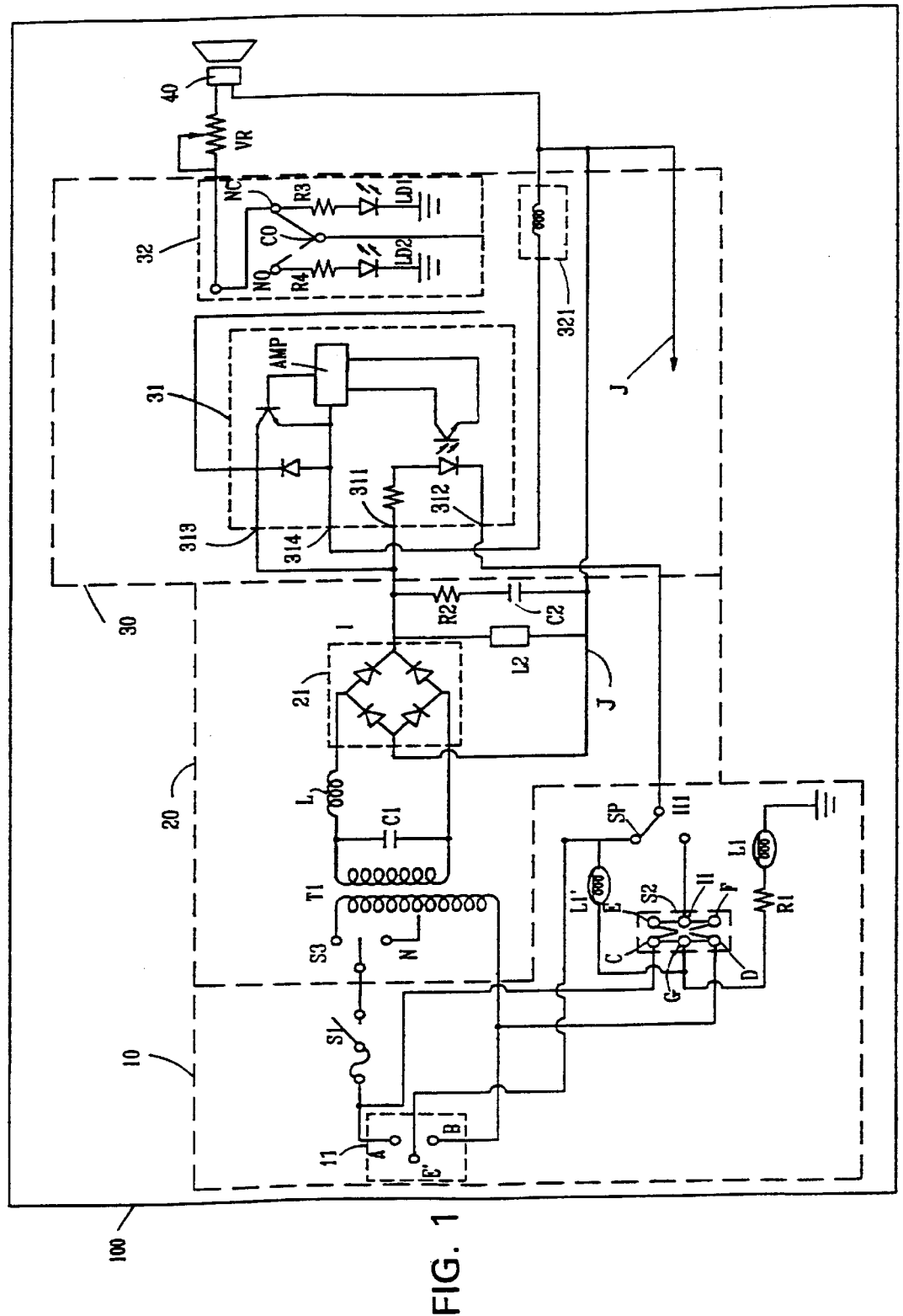
FIG. 1 is a detailed circuit diagram of a ground detector according to the present invention.
Figure 2:
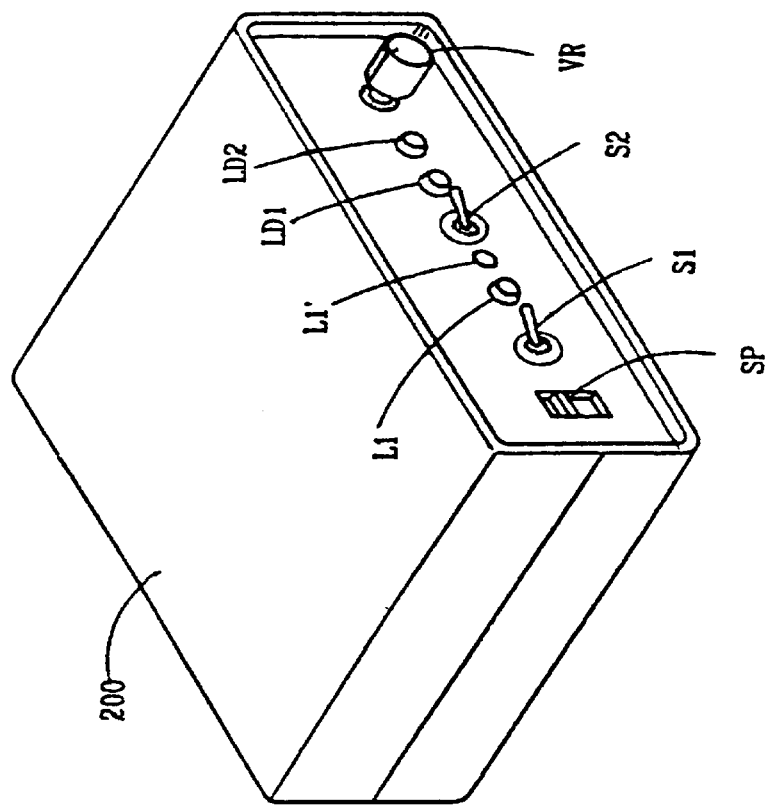
FIG. 2 is an elevational view of the ground detector of the preferred embodiment of the present invention.
Figure 3:
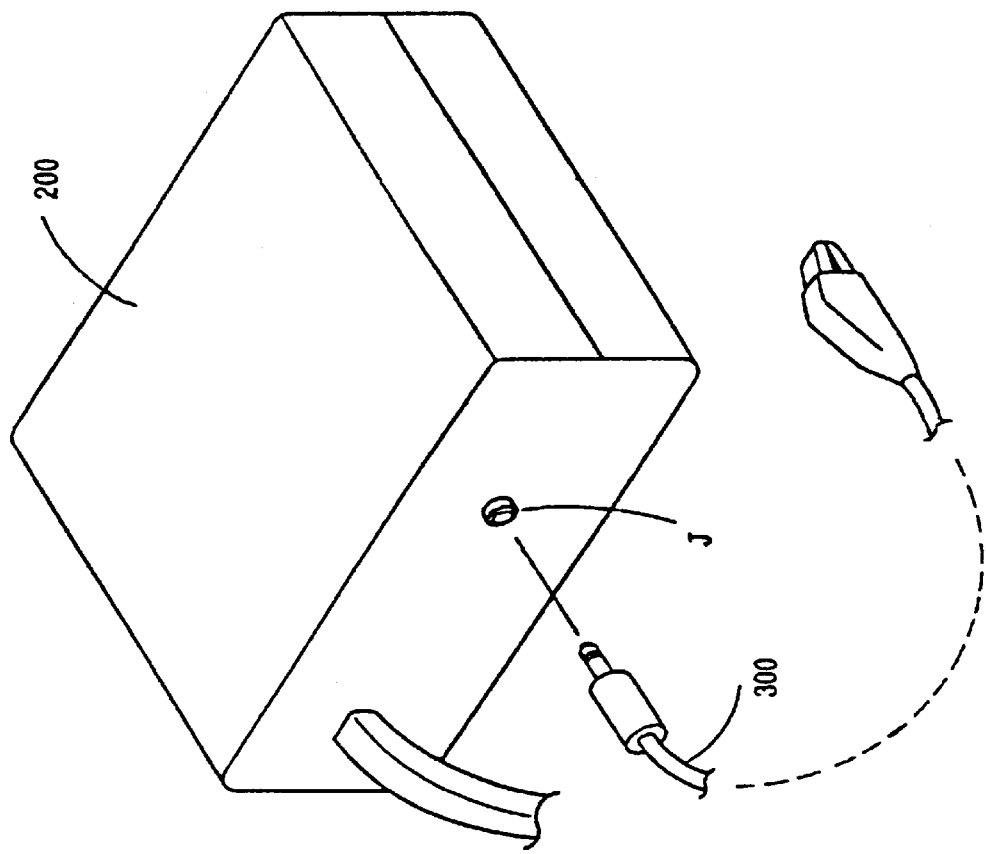
FIG. 3 is an elevational view of the ground detector taken from another angle according to the present invention.

Referring to FIG. 1, a ground detector for a static grounding system in accordance with the present invention is generally comprised of a detecting circuit 100, a voltage dropping and rectifying circuit 20, a switching switch S2, and a grounding test circuit 30.

The detecting circuit 100 comprises a polarity test circuit 10. The polarity test circuit 10 comprises a plug 11 for connection to an AC power supply outlet to obtain AC 110V or AC 220V, a power switch S1 connected to one power wire A to control power supply.

The switching switch S2 is a multi-throw multi-contact switch, for example, a double-blade double-throw three-way switch, in which selective contacts C,D are respectively connected to power wires A,B, and cross-linking to selective contacts E,F; common contact G is connected in series to a resistor R1 and a polarity indicator light L1, which can be a neon lamp or the like. The end of the series network of the resistor R1 and the polarity indicator light L1 is connected to the metal shell of the switching switch S2 or its metal handle (not shown). In FIG. 1, the connection of the end of the series network to the switching witch S2 is indicated by a grounding sign. When the switching switch S2 is operated to connect common contact G to power wire A or B, the user can touch the metal handle or metal shell of the switching switch S2 with the hand (relative zero potential) to see on/off condition of the polarity indicator light L1, so as to determine if the power wire A or B is the neutral wire of AC single-phase double-wire 110V power supply. i.e. the true zero potential wire. The other common contact H of the switching switch S2 is lead out as reference zero potential when one power wire A or B is identified the neutral wire.

In a single-phase three-wire 220V system, the central earth wire E' is connected to one terminal of a polarity test indicator light L1'. The other terminal of the polarity test indicator light L1' is connected to common contact G of the switching switch S2. By means of operating the switching switch S2 to turn on the polarity test indicator light L1', the central earth wire E' is confirmed of true zero potential. This test prevents a false grounding of the central earth wire E'. The central earth wire E' and the common contact H of the switching switch S2 are respectively connected to selective contacts of a test switch SP. The common contact H of the test switch SP is lead out for switching of grounding test reference zero potential between single-phase double-wire system and single-phase three-wire system.

Figure 4:
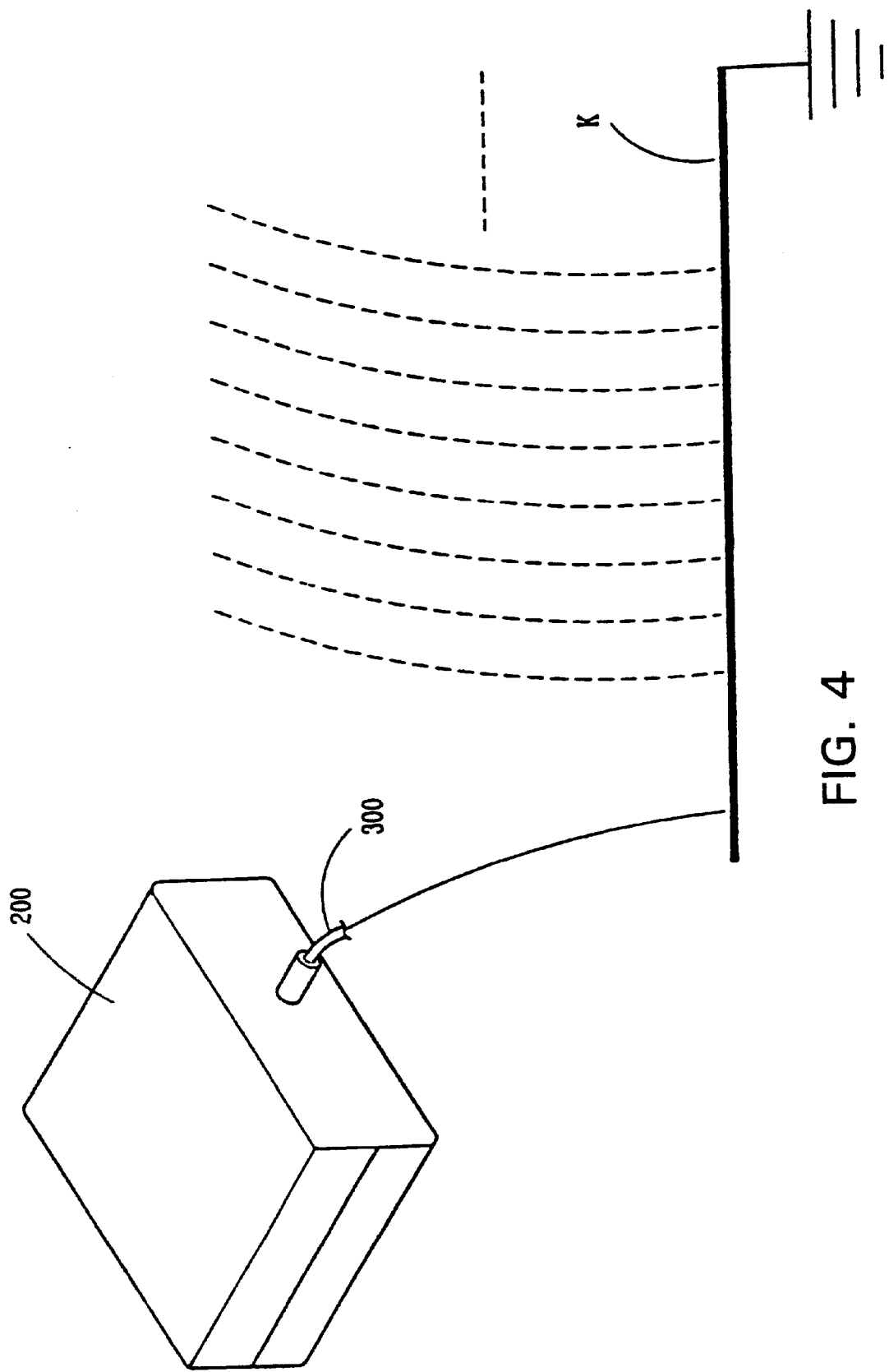
FIG. 4 is an applied view of the present invention, showing the ground detector connected to a grounding bus.

The voltage dropping and rectifying circuit 20 comprises a transformer T1. The transformer T1 has a knob N at its high voltage side, which controls a voltage selector switch S3 to selectively connect the power wire A or the power wire B, enabling AC 110V or AC 220V city power supply to be selectively guided in. The transformer T1 has its low voltage side coupled with a capacitor C1 and an induction coil L to restrain surge. The capacitor C1 and the induction coil L are connected to a bridge rectifier 21. The bridge rectifier 21 has its positive terminal I connected to the grounding test circuit 30 and its negative terminal J connected to a test point at a grounding bus K (see FIG. 4) for grounding comparison. A filter network, which is comprised of a resistor R2 and a capacitor C2, and a power indicator circuit 12 are connected between the positive terminal I and negative terminal J of the bridge rectifier 21 to stabilize DC output and to indicator DC output status. The power indicator circuit 12 can be formed of any of a variety of indicator lights, or any light set.

The grounding test circuit 30 comprises a photoelectric means 31, and a relay 32. The photoelectric means 31 can be formed of a photoelectric coupler or SSR (solid state relay). In FIG. 1, the photoelectric means 31 is a SSR having an amplifier AMP in it adapted to amplify output power. The non-inverter terminal 311 and inverter terminal 312 of the photoelectric means 31 are respectively connected to the positive terminal I of the bridge rectifier 21 of the voltage dropping and rectifying circuit 20 and the common contact H1 of the test switch SP of the polarity test circuit 10. The positive output terminal 313 of the photoelectric means 31 is connected to the positive terminal I of the bridge rectifier 21 and the common contact CO of the relay 32. The two opposite ends of the energizing coil 321 of the relay 32 are respectively connected to the negative output terminal 314 of the photoelectric means 31 and the negative terminal J of the bridge rectifier 21. The normal close contact NC of the relay 32 is connected in series to a variable resistor VR, and then connected to the negative terminal J of the bridge rectifier 21 through an alarm device 40. The alarm device 40 can be a buzzer, speaker, or any of a variety of audio alarm circuit means. The variable resistor VR controls the volume or output power of the alarm device 40, and receives false grounding alarm driving signal from the grounding test circuit 30. The normal close contact NC of the relay 32 is connected to a first warning network formed of a resistor R3 and a light emitting diode LD1. The normal open contact NO of the relay 32 is connected to a second warning network formed of a resistor R4 and a light emitting diode LD2. The light emitting diode LD1 works synchronously with the alarm device 40. The light emitting diode LD2 indicates normal grounding status. Both light emitting diodes LD1, LD2 have different colors for quick discrimination.

The operation of the detecting circuit 100 is outlined hereinafter. The first step of the operation of the present invention is to find which power wire A or B is connected to the true earth wire or neutral wire by: touching the metal handle or metal shell of the switching switch S2 before switching on the power switch S1, and then operating the switching switch S2 to check the on/off status of the polarity indicator light L1. For example, if the polarity indicator light L1 is turned on when the switching switch S2 and the test switch SP are respectively switched down, it means that the power wire B which is connected to the common contact H of the switching switch S2 is the earth wire, and relatively, the other power wire A is the hot wire carrying a voltage. The reference voltage of the true earth wire is sent through the common contact H to the inverter terminal 312 of the photoelectric means 31 of the grounding test circuit 30. When the power switch S1 is switched on, the negative terminal J of the bridge rectifier 21 which is connected to the grounding bus K (see FIG. 4) produces with the common contact H1 a potential comparison effect, i.e., the grounding potential of the grounding bus K can be equal to the grounding potential from the common contact H1 only when the grounding bus K is positively connected to earth. If the grounding bus K is not positively connected to earth, the potential at the common contact H1 is unequal to the potential at the negative terminal J of the bridge rectifier 21. i.e., a potential difference exists, causing the photoelectric means 31 unable to work, therefore the non-inverter terminal 313 and the negative output terminal 314 of the photoelectric means 31 are electrically disconnected, the coil 321 of the relay 32 does no work, and the alarm device 40 is driven by an alarm driving signal to output an alarm signal.

On the contrary, when the grounding bus K is positively connected to earth, the potential at the negative terminal J of the bridge rectifier 21 is equal to the potential at the common contact H1 of the test switch SP, the photoelectric means 31 works, causing the coil 321 of the relay 32 to be energized, and therefore the normal close contact NC1 is turned to a broken circuit status, and the alarm device 40 receives no driving signal and gives no output.

Referring to Figures from 2 through 4, the aforesaid detecting circuit 100 is packed within a casing 200, with the polarity indicator light L1, the indicator light L2 of the power indicator circuit L2, the power switch S1, the switching switch S2, the test switch SP and the variable resistor VR disposed on the outside of the casing 200. The light emitting diodes LD1, LD2 of the grounding test circuit 30 are also disposed on the outside of the casing 200. The negative terminal J of the bridge rectifier 21 is lead out of the casing 200, and then connected to the related test point at the grounding bus K through a low impedance test line 300, enabling the grounding condition of the grounding bus K to be quickly detected. If the grounding bus K is not positively connected to earth, the error grounding is immediately detected by the detecting circuit 100, and the detecting circuit 100 immediately outputs an alarm signal, warning the person at the job site to stop working and to inspect the static grounding system.

Figure 5:
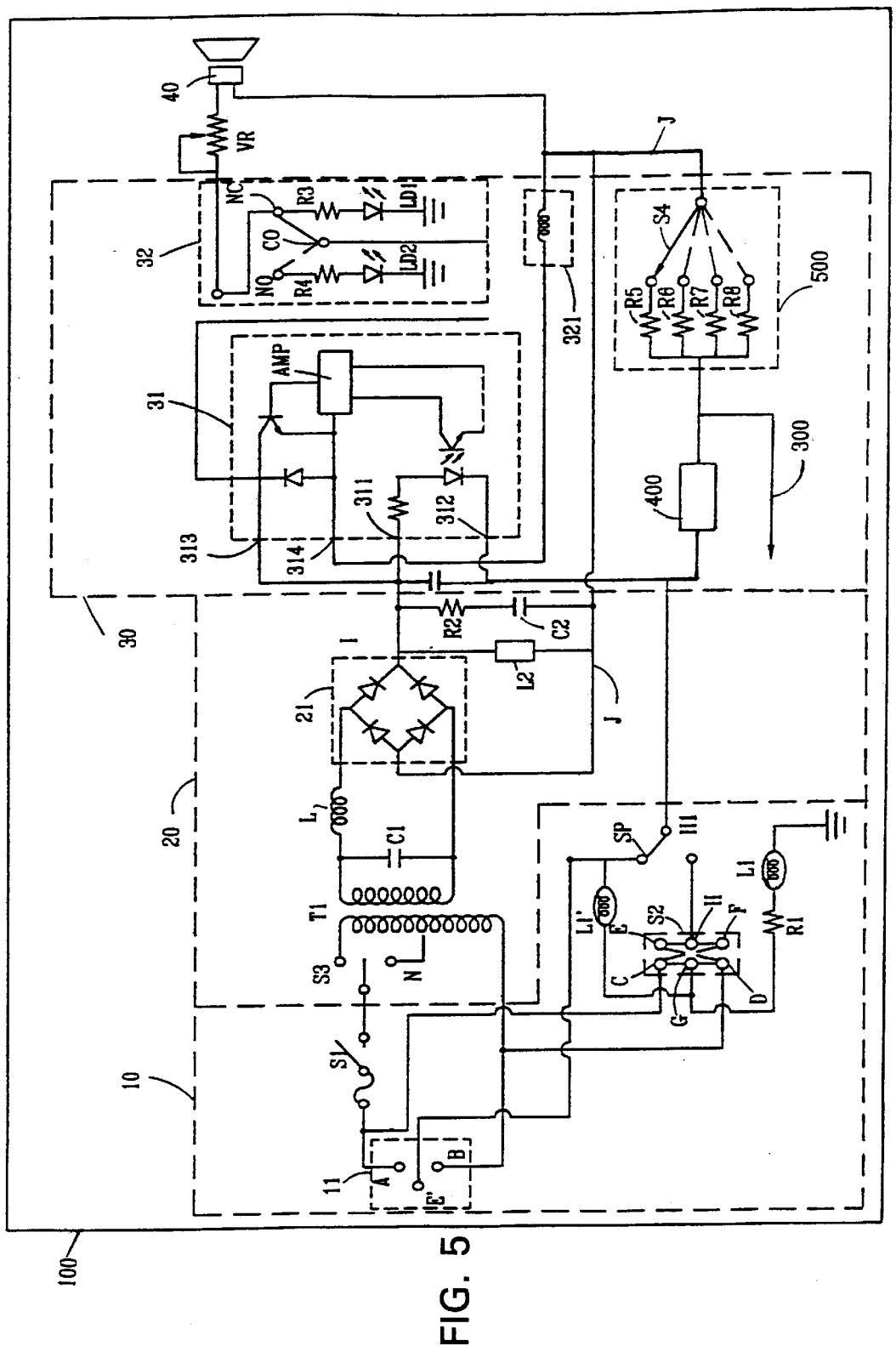
FIG. 5 is a detailed circuit diagram of a ground detector according to another embodiment of the present invention.

FIG. 5 shows an alternate form of the detecting circuit 100. According to this alternate form, the a diode D1 and a resistor R1 are connected in series between one common contact H of the switching switch S2 and one selection contact of the test switch SP, to prevent an electric shock upon a contact of the hot wire. A resistance meter 400 and a selector resistor network 500 are respectively connected between the negative terminal J of the bridge rectifier 21 of the voltage dropping and rectifying circuit 20 and one selection contact of the test switch SP. The resistance meter 400 is a earth-resistance meter with index or LCD display means. The selector resistor network 500 is comprised of a switch S4 and a plurality of resistors R5,R6,R7,R8. In FIG. 5, the inverter terminal 312 of the photoelectric means 31 is connected to the negative terminal J of the bridge rectifier. Therefore, when the relay 32 works, the normal close contact NC is turned into normal open contact NO, and the alarm device 40 can be freely stopped.

Further, the inverter terminal 312 of the photoelectric means 31 shown in FIG. 5 is connected to the central earth wire E' of AC input power supply, and the negative terminal J of the bridge rectifier 21 is connected to the grounding bus K, therefore the grounding bus K must be maintained at a true grounding status (because the earth is a goof conductor). If the grounding bus K is positively connected to earth, the normal close contact NC of the relay 32 shown in FIG. 5 is chanced to a normal open contact NO, causing the alarm device 40 unable to work. If the grounding bus K is not positively connected to earth, the normal close contact NC of the relay 32 shown in FIG. 5 is connected to the positive terminal I of the bridge rectifier 21, enabling DC power supply to be directly transmitted to the alarm device 40, causing the alarm device 40 to output an alarm signal.

The resistors R5,R6,R7,R8 shown in FIG. 5 are used to limit the earth resistance value to a limited range in which the alarm device 40 can be driven to alarm. The calculation of total earth resistance is started from the inverter terminal 312 of the photoelectric means 31 and ended at the negative terminal J of the bridge rectifier 21. The definition of earth resistance value is determined subject to US army standards or CECC 00015 or BSS958, or static safety standards issued by Japan Industrial Security Research Institute. These standards define different requirements on static earth-resistance value ranging from 1 kOhm to one million ohm. The resistors R5,R6,R7,R8 enable the resistance meter 400 to meet different standards.

It is to be understood that the drawings are designed for purposes of illustration only, and are not intended as a definition of the limits and scope of the invention disclosed.

What the invention claimed is:

1. A ground detector for a static grounding system, comprising:
    a polarity test circuit connected to AC power supply, said polarity test circuit comprising a switching switch, a test switch, a polarity indicator light and a polarity test indicator light, said polarity indicator light and said polarity test indicator light each having one end respectively connected to one common contact of said switching switch, said polarity indicator light having an opposite end connected to a metal shell of said switching switch, said polarity test indicator light having an opposite end connected to the central earth wire of a single phase three-wire system and connected to a selection contact of said test switch to lead out a single-phase three-wire reference zero potential said switching switch having a first common contact connected to said polarity indicator light and said polarity test indicator light and a second common contact connected to a second selection contact of said test switch to lead out a single-phase two-wire reference zero potential, the earth wire of the single-phase two-wire or single-phase three-wire system being detected subject to the on/off status of said polarity indicator light and said polarity test indicator light when said switching switch is operated and the metal shell of said switching switch is touched with the hand;
    a voltage dropping and rectifying circuit, said voltage dropping and rectifying circuit comprising a transformer and a bridge rectifier and rectifying AC power supply from said polarity test circuit into DC power supply, said bridge rectifier having a negative terminal connected to the earth bus to be tested;
    a grounding test circuit connected to said voltage dropping and rectifying circuit to receive DC power supply from it, said grounding test circuit comprising a photoelectric means and a relay, said photo electric means having a non-inverter terminal and an inverter terminal respectively connected to the positive terminal of said bridge rectifier and the earth wire of the single-phase two-wire or single-phase three-wire system being connected to the common contact of said test switch, a positive output terminal connected to the positive terminal of said bridle rectifier and the common contact of said relay, and a negative output terminal connected to the negative terminal of said bridge rectifier through a coil of said relay, enabling the potential at the negative terminal of said bridge rectifier to be compared with the potential at the earth wire of AC power supply, so as to determine the grounding condition of the grounding bus which is connected to said bridge rectifier, and to let said relay be energized or not energized subject to the grounding condition of the grounding bus detected, causing the common contact of said relay to output or not to output an alarm driving signal; and
    an alarm device connected to the normal close contact of said relay and the negative terminal of said bridge rectifier, and controlled by said relay to output an alarm signal when the grounding bus which is connected to said bridge rectifier is not positively connected to earth.

2. The ground detector of claim 1 wherein said polarity test circuit comprises a power switch, which controls input of AC power supply.

3. The ground detector of claim 1 wherein the switching switch of said polarity test circuit and said test switch are multi-throw multi-contact switches.

4. The ground detector of claim 1 wherein said polarity indicator light of said polarity test circuit is a neon lamp.

5. The ground detector of claim 1 wherein the transformer of said voltage dropping and rectifying circuit has a knob at a high voltage side thereof for selectively controlling input of different voltages of city power supply.

6. The ground detector of claim 5 wherein said knob is connected with a voltage selector switch to select input of different voltages of city power supply.

7. The ground detector of claim 1 wherein the transformer of said voltage dropping and rectifying circuit has a low voltage side connected to said bridge rectifier through a capacitor and an induction coil to restrain surge.

8. The ground detector of claim 1 wherein said voltage dropping and rectifying circuit further comprises a filter network connected between the negative terminal and positive terminal of said bridge rectifier to stabilize DC output.

9. The ground detector of claim 8 wherein said filter network is comprised of capacitor means and resistor means.

10. The ground detector of claim 1 wherein said voltage dropping and rectifying circuit further comprises a power indicator light connected between the positive terminal and negative terminal of said bridge rectifier to indicate DC output status.

11. The ground detector of claim 10 wherein said power indicator circuit is comprised of at least one indicator light.

12. The ground detector of claim 1 wherein the photoelectric means of said grounding test circuit is a solid state relay.

13. The ground detector of claim 12 wherein said solid state relay comprises an amplifier on the inside.

14. The ground detector of claim 1 wherein the photoelectric means of said grounding test circuit is a photoelectric coupler.

15. The ground detector of claim 1 wherein said grounding test circuit further comprises a variable resistor connected between the normal close contact of said relay and said alarm device, and controlled to regulate the output power of said alarm device.

16. The ground detector of claim 1 wherein said alarm device is comprised of buzzer means.

17. The ground detector of claim 1 wherein said alarm device is comprised of speaker means.

18. The ground detector of claim 1 wherein the normal close contact and normal open contact of said relay are respectively connected to a warning and display network formed of a resistor and a light emitting diode for indicating normal grounding status and alarm status of the grounding test.

19. A ground detector for a static grounding system, comprising:
    a polarity test circuit connected to AC power supply, said polarity test circuit comprising a switching switch, a test switch, a polarity indicator light, and a polarity test indicator light, said polarity indicator light and said polarity test indicator light each having one end respectively connected to one common contact of said switching switch, said polarity indicator light having an opposite end connected to a metal shell of said switching switch, said polarity test indicator light having an opposite end connected to the central earth wire of a single phase three-wire system and connected to a selection contact of said test switch to lead out a single-phase three-wire reference zero potential, said switching switch having a first common contact connected to said polarity indicator light and said polarity test indicator light and a second common contact connected to a second selection contact of said test switch to lead out a single-phase two-wire reference zero potential, the earth wire of the single-phase two-wire or single-phase three-wire system being detected subject to the on/off status of said polarity indicator light and said polarity test indicator light when said switching switch is operated and the metal shell of said switching switch is touched with the hand:

a voltage dropping and rectifying circuit, said voltage dropping and rectifying circuit comprising a transformer and a bridge rectifier and rectifying AC power supply from said polarity test circuit into DC power supply, said bridge rectifier having a negative terminal connected to the earth bus to be tested;

a grounding test circuit connected to said voltage dropping and rectifying circuit to receive DC power supply from it, said grounding test circuit comprising a photoelectric means and a relay, said photo electric means having a non-inverter terminal and an inverter terminal respectively connected to the positive terminal of said bridge rectifier and the earth wire of the single-phase two-wire or single-phase three-wire system being connected to the common contact of said test switch, a positive output terminal connected to the positive terminal of said bridge rectifier and the common contact of said relay, and a negative output terminal connected to the negative terminal of said bridge rectifier through a coil of said relay, enabling the potential at the negative terminal of said bridge rectifier to be compared with the potential at the earth wire of AC power supply, so as to determine the grounding condition of the grounding bus which is connected to said bridge rectifier, and to let said relay be energized or not energized subject to the grounding condition of the grounding bus detected, causing the common contact of said relay to output or not to output an alarm driving signal;

an alarm device connected to the normal close contact of said relay and the negative terminal of said bridge rectifier, and controlled by said relay to output an alarm signal when the grounding bus which is connected to said bridge rectifier is not positively connected to earth; and a resistance meter and a selector resistor network respectively connected between the negative terminal of said bridge rectifier of said voltage dropping and rectifying circuit and the grounding bus, said resistance meter reading out the grounding resistance value through said selector resistor network after the central earth wire of AC power supply system and the grounding bus have been connected to earth, for determining the grounding status of the grounding bus.

20. The ground detector of claim 19 wherein said resistance meter is an index display type resistance meter.

21. The ground detector of claim 19 wherein said resistance meter is a LCD type resistance meter.

22. The ground detector of claim 19 wherein said selector resistor network is comprised of a switch and a plurality of resistors.

23. The ground detector of claim 22 wherein the switch of said selector resistor network is operated to selectively connect the resistors of said selector resistor network to said resistance meter.

* * * * *